Patented Aug. 7, 1934

1,969,242

UNITED STATES PATENT OFFICE 1,969,242

METHOD OF DISPERSING SOLIDS

Andrew Szegvari, Akron, Ohio, assignor to American Anode, Inc., Akron, Ohio, a corporation of Delaware No Drawing. Application February 8, 1932, Serial No. 591,761

9 Claims. (Cl. 252—6)

This invention relates to the art of preparing aqueous dispersions, that is to say, very finely divided suspensions of solids in an aqueous or other similar liquid.

Numerous methods have heretofore been developed for dispersing solids in water and similar liquids. Such dispersions have found a very wide usefulness in a great variety of industrial applications, either alone or in admixture with other dispersions or emulsions. However, considerable difficulty has heretofore been experienced in preparing dispersions of many solid substances of a usefully high concentration and degree of fineness. Those substances which have a melting point above the boiling point of water are not susceptible to the emulsification processes, but must be dispersed by a grinding process. These solid substances are easily reduced to the fineness of commercial pigments, say from 10 to 50 $\mu$ (a $\mu$ is a micron or one thousandth of a millimeter); but these particles of 10 to 50 $\mu$, which are far too coarse for practical use in most aqueus dispersions, are extremely resistant to further subdivision and only a small proportion of them can be reduced to a dispersion of a particle size less than 4 or 5 $\mu$, even by prolonged and intensive grinding in a solution containing dispersing agents. Substances with a melting point only slightly above the boiling point of water, so that they cannot be melted and emulsified hot, frequently are very difficult to grind to the fine particle size desired in colloidal dispersions or suspensions. Even a prolonged grinding of the fine particles does not further reduce their size, but sometimes even tends to cause them to agglomerate into larger masses. This class of substances includes such typical materials as sulphur, melting at 112° C. and mercaptobenzothiazole, melting at 170 to 180° C., depending on its purity. Both of these substances are employed on a very large scale in the vulcanization of rubber, yet their use in latex, in the direct manufacture of rubber goods from the liquid rubber latex, has been greatly limited because of the difficulty of securing them in a finely dispersed form which would not settle out and which would form a uniform rubber mass free from gross particles of the said substances. Previously known fine dispersions of these substances have been very dilute, excessively expensive, and have contained large proportions of foreign matters of a disturbing character.

An object of this invention accordingly is the production of fine dispersions of a high concentration of substances melting above the boiling point of water. Another object is the production of dispersions of such substances, by a method giving a high yield of finely dispersed particles. Another object is the production of fine dispersions of substances melting somewhat above the boiling point of water but tending to agglomerate at temperatures below the boiling point of water. Another object is to prepare such dispersions by a method permitting the complete utilization of the dispersed substance. Another object is to prepare such dispersions of a high concentration and with a minimum proportion of dispersing agents and other foreign substances. A further object is to prepare such dispersions in a form readily miscible with other aqueous dispersions such as rubber latex. Other objects will be apparent from the following description of the invention.

This invention consists broadly in subjecting a solid, friable substance, in masses considerably above the range of sizes of pigments, to intensive mechanical disruptive forces in the presence of a dispersion liquid. The dispersion liquid is preferably water containing a dispersing agent, preferably one which combines some peptizing power with a protective action, such as casein, gelatine, albumen, soap, sulphonated oils, saponin, water glass, etc., or any mixture of such substances. The solid substance which is to be dispersed is preferably employed in masses of a size ranging from, say one-fourth inch in diameter to particles which are just retained by a 100 mesh sieve.

If the solid substance which is to be dispersed is readily fusible it is prepared by melting it and pouring the hot liquid through a screen or sieve into cold water in much the same manner in which shot is produced in a shot tower. The substance is thereby caused to cool suddenly in globules of approximately spherical shape. The sudden cooling of the substance creates a peculiar physical condition of friability which is probably dependent at least in part on the rapid radial crystallization of the substance in a very fine crystal structure. Upon being subjected to mechanical disintegration in a suitable colloid mill the globules are rapidly broken up and the fragments disrupted to an exceedingly small particle size. This latter operation should be carried out in the presence of a small proportion of a suitable protective colloid. A certain proportion of relatively coarse fragments may remain which do not readily yield to further disintegration. They are readily eliminated by allowing them to settle and decanting off the supernatant fine dispersion, or even more rapidly, by centrifugal separation. The coarse material may then be dried, remelted, and again treated as described above.

The superior results attained by subjecting the substance to the action of the dispersing forces in a coarse rather than in an initially moderately fine condition is probably ascribable largely to the peculiar nature of the forces acting in a modern colloid mill. Such mills consist ordinarily of two opposing surfaces moving past one another at a very high speed with a small clearance, one of the surfaces sometimes being stationary, or both moving in opposite directions. The surface may be either smooth, stepped, or fluted. The particles of a suspension entering such a mill are directed at a high velocity toward the working faces, are subjected to impact with the rapidly moving surface, and finally to an intensive shearing action as they pass through the small clearance between the moving parts. Particles of intermediate or small size tend to pass through the mill substantially without change because of their low inertia and because they are smaller than the clearance normally attainable in such a mill. However, the larger particles employed in the method of this invention have a very considerable inertia and are consequently subjected to an intensive impact with the moving parts of the mill, as well as to shearing forces, the combined effect of which is to shatter the particles, forming numerous very fine particles. The impact action is particularly marked in colloid mills with closely adjacent fluted working surfaces, and such mills are preferred for that reason.

As a specific example of one embodiment of this invention, sulphur is prepared in globules of from 8 to 10 mesh size, that is, capable of passing a sieve of 8 meshes per inch but retained by a sieve of 10 meshes per inch. 100 parts by weight of this so-called "pellet sulphur" are stirred into a liquid consisting of a solution of 1 part gelatine and 1 part casein in 65 parts of slightly alkaline water. The mixture is then passed through a colloid mill of the high-speed small clearance type. The colloid mill may contain a single rotor and stator or a pair of rotors turning in opposite direction. The working faces of the mill may be smooth or fluted. Good results have been obtained, for example, in a mill with an approximately cylindrical fluted rotor of about 6 in. diameter rotating at 3600 R. P. M. in a fluted stator with a clearance of from 2 to 5 thousandths of an inch. The mixture is circulated through the mill and then through a cooling device in a continuous cycle, the temperature being maintained below 60° C. The liquid is then withdrawn into a shallow tank, allowed to settle over night, and the liquid dispersion is decanted off.

The concentration of the dispersion is about 60% sulphur and the average particle size about $0.3\mu$, the maximum particle size being only $1\mu$. About 50% of the sulphur is contained in the dispersion, whereas if a moderately fine sulphur, such as "flowers of sulphur" were used as a starting material, the greater part would remain unground. A somewhat higher yield may be obtained by decreasing the settling time. In such case the particle size will be somewhat greater, possibly ranging to a maximum particle size of $4\mu$. Previously known dispersions of sulphur of this degree of fineness never exceeded a concentration of about 25%, while the particle size of more concentrated dispersions has averaged from 5 to 10 $\mu$ or over.

The coarser particles settled out of the dispersion are dried, remelted, formed into pellets, and used in a subsequent batch.

The dispersion of sulphur prepared as described above may be diluted with pure water to any desired extent. It may be mixed with other alkaline dispersions including natural or artificial rubber latex in any desired proportions. It may be sprayed on plants as a fungicide, and is found to be especially effective because of its uniform fine particle size.

Other substances which are friable at ordinary temperatures, including mercaptobenzothiazole, hard resins, and even glass or silica (sand) may be dispersed in the same or a similar manner. The substances may be prepared for dispersion in fragments or pellets of various sizes, from about 100 mesh to any size which will be handled in the particular colloid mill under consideration, but the 8 to 20 mesh sizes are preferred for most substances, as they are most conveniently handled and give a high yield of very fine particles. The pellets may be mechanically ground in any desired manner, as in an ordinary ball mill, but a high speed colloid mill is preferred as it apparently subjects the pellets to an impact or to an intensive shearing action which instantly shatters the pellets in a shorter time than does a mill with a less intensive action. The proportion and nature of the dispersing agents such as protective colloids and peptizing agents is subject to a very wide latitude of choice, depending largely on the use to which the dispersion is to be put. Many materials are known to colloid chemists which may be substituted for those mentioned specifically above, but the combination of gelatine and casein has been found to give satisfactory dispersions which are readily miscible with latex without introducing any disturbing factors into the latex or the rubber composition obtained therefrom.

It is evident that the invention is not limited to the specific examples given, but that it is subject to numerous modifications without exceeding the spirit and scope of the appended claims.

I claim:

1. The method of dispersing sulphur which comprises melting the sulphur, pouring it in a stream of discrete droplets into cold water to form it into moderately small pellets, and subjecting the pellets to a mechanical disintegration in the presence of water containing a dispersing agent.

2. The method of dispersing sulphur which comprises melting the sulphur, pouring it in a stream of discrete droplets into cold water to form moderately small pellets, and subjecting the pellets to an intensive mechanical disintegration in a high-speed colloid mill in the presence of water containing a dispersing agent.

3. A method as in claim 2, in which the dispersion is allowed to settle, and the supernatant dispersion of the finest particles is decanted off.

4. The method of dispersing sulphur which comprises melting the sulphur, pouring it in a stream of discrete droplets into cold water to form moderately small pellets, subjecting the pellets to an intensive mechanical disintegration in a high-speed colloid mill in the presence of water containing a dispersing agent, separating relatively coarse particles from the fine dispersion, drying and remelting the separated particles, and repeating the steps of the process to disperse the remelted material.

5. The method of dispersing sulphur which comprises melting sulphur, chilling it in the form of moderately small pellets, and subjecting a mixture of at least 30% of the pellets with a dispersing fluid to a mechanical disintegration.

6. The method of dispersing sulphur which comprises melting sulphur, pouring it in a stream of discrete droplets into cold water to form moderately small pellets, and subjecting a mixture of at least 30% of the said pellets with water containing a dispersing agent to intensive mechanical disintegration in a colloid mill.

7. A method as in claim 6, in which the finely dispersed sulphur is separated from relatively coarse particles by settling.

8. A method as in claim 6, in which relatively coarse particles are separated from the finely dispersed sulphur by settling, and are dried, remelted, and dispersed by the same method.

9. The method of dispersing sulphur which comprises melting sulphur, chilling it in the form of moderately small pellets, and subjecting the pellets to a mechanical disintegration in the presence of water containing a dispersing agent.

ANDREW SZEGVARI.